United States Patent

Moslehi et al.

[11] Patent Number: 5,940,556
[45] Date of Patent: Aug. 17, 1999

[54] FIBER-OPTIC MODE-ROUTED ADD-DROP FILTER

[75] Inventors: Behzad Moslehi, Mountain View; Richard James Black, Palo Alto; Herbert John Shaw, Stanford, all of Calif.

[73] Assignee: IFOS, Mt. View, Calif.

[21] Appl. No.: 08/813,165

[22] Filed: Mar. 7, 1997

[51] Int. Cl.$^6$ .................................................. G02B 6/26
[52] U.S. Cl. .......................... 385/28; 385/24; 385/27; 385/37
[58] Field of Search .................. 385/28, 24, 27, 385/29, 30, 31, 32, 37, 38, 39

[56] References Cited

U.S. PATENT DOCUMENTS

| | | |
|---|---|---|
| 4,268,116 | 5/1981 | Schmadel . |
| 4,622,663 | 11/1986 | Ishikawa . |
| 4,986,624 | 1/1991 | Sorin et al. ............................ 385/37 |
| 5,048,913 | 9/1991 | Glenn . |
| 5,237,576 | 8/1993 | DiGiovanni . |

OTHER PUBLICATIONS

Sorin & Shaw, A Single Mode Fiber Evanescent Grating Reflector, Journal of Lightwave Technology LT–3: 1041–1045 (1985) no month.

Hill et al, Photosensitivity in Optical Fiber Waveguides: Application to Reflected Filter Fabrication, Applied Physics Letters 32: 647–649 (1978) May 15.

Meltz et al, Formation of Bragg Gratings in Optical Fibers by a Transverse Holographic Method. Optics Letters 14: 823–825 (1989) Apr. 28.

Hill et al, Efficient Mode Conversion in Telecommunication Fibre Using Externally Written Gratings Electronics Letters 26: 1270–1272 (1990) Aug. 2nd.

Bergh, Kotler & Shaw, Single Mode Fibre Optic "Directional Coupler" Bergh et al. Electronics Letters 16(7) (1980) Mar.

Leminger & Zengerle, Determination of Single–Mode Fiber Coupler Design Parameters From Loss Measurement, IEEE Journal of Lighwave Technology, LT–3: 864–867 (1985) no month.

Sorin, Kim, Shaw, Highly Selective Evanescent Modal Filter For Two–Mode Optical Fibers, Optics Letters 11: 581–583 (1986).

Hill et al, Optical Fiber Directional Couplers: Biconical Taper Technology and Device Applications, Proceedings SPIE 574: 92–99 (1985) no month.

Bures, Lapierre, Lacroix; Analyse d'un Coupleur Bidirectional a Fibres Optiques Monomodes Fusionnees, Applied Optics 22: 1918–1921 ( Jun. 1983).

Sheen, Guallorenzi: Single Mode Power Divider: Encapsulated Etching Techniques. Optics Letters 4(1): 29–31 (1979) Jan.

Ribeiro et al, Analysis of the Reflective–Matched Fiber Bragg Grating Sensing Interrogation Scheme, Applied Optics 36: 934–939 (1997) Feb.

*Primary Examiner*—Phan T. H. Palmer

[57] ABSTRACT

New elements mode-converting two-mode grating and mode-filtering two-mode coupler are disclosed and used as elements in a system for communications, add-drop filtering, and strain sensing. Methods of fabrication for these new two-mode gratings and mode-filtering two-mode couplers are also disclosed.

26 Claims, 5 Drawing Sheets

FIBER-OPTIC MODE-ROUTED ADD-DROP FILTER

FIELD OF THE INVENTION

The current invention applies to the field of optical waveguide, particularly fiber-optic, filtering devices which involve bi-directional conversion of energy between two optical waveguide modes and mode-dependent routing of energy as well as allow the adding and/or dropping of wavelength channels from an optical waveguide bus.

BACKGROUND OF THE INVENTION

Modern optical fiber typically comprises an inner glass core surrounded by a glass cladding and a protective plastic jacket. Guidance of electromagnetic waves is achieved by the core having a slightly higher index of refraction than the surrounding cladding.

Electromagnetic waves that propagate in optical fibers may be decomposed in terms of optical fiber modes. Modes can be either (a) bound core modes which have the majority of their energy confined to the vicinity of the core and can propagate over long distances, or (b) cladding modes or radiation modes which are rapidly attenuated. Optical fibers can be classified as single-mode, two-mode, few-mode, or highly multimode depending on the number of bound core modes that they support.

The number of modes increases with the guidance parameter V which is proportional to the product of (a) the ratio of the core diameter $\phi_{co}$ with respect to the wavelength $\lambda$ and (b) the numerical aperture NA which is related to the difference between the core and cladding refractive indices $n_{co}$ and $n_{cl}$ respectively, i.e., $$V = \pi (\phi_{co}/\lambda) NA$$

where $NA = (n_{co}^2 - n_{cl}^2)^{1/2}$.

Typical values for the core diameter are of order 10 $\mu$m for single-mode and two-mode or few-mode fiber operating at communications wavelengths of 1300–1550 nm, and 50 $\mu$m or 62.5 $\mu$m for highly multimode fiber. Whether single-mode or multimode, the cladding diameter has most commonly an overall diameter of 125 $\mu$m, and a plastic jacket diameter is typically 250 $\mu$m for standard fiber. The glass core is generally doped with germanium to achieve a slightly higher index of refraction than the surrounding cladding by a factor of roughly 1.001. The jacket is generally plastic and is used to protect the core and cladding elements. It also presents an optically discontinuous interface to the cladding thereby preventing coupling modes in the cladding to other adjacent fibers, and usually plays no significant part in the optical behavior of the individual fiber other than the usually rapid attenuation of cladding modes in comparison with bound core modes.

Two-mode fibers have core dimensions of the same order as those for single-mode fibers except that overall the guidance parameter V is slightly larger, e.g., for fibers with a uniform core and cladding indices (known as step index fibers), V is less than 2.4 for single-mode fibers and between 2.4 and 3.8 for two-mode fibers. Note that as well as or use a fiber which is designed to be single-mode at typical telecommunications wavelengths of 1300 nm and 1550 nm will function as two-mode at shorter wavelengths. One can also fabricate fiber with a slightly larger core diameter and/or NA to function as two-mode fiber at the above wavelengths.

As described in the book by Snyder and Love entitled *Optical Waveguide Theory* published by Chapman and Hall (London, 1983), under the assumptions of longitudinal invariance and small index differences for which the scalar wave equation is applicable, the modal field magnitudes may be written $$\Psi(r,\phi,z) = \psi(r,\phi) \exp \{i(\beta z - \omega t)\}$$

where
  $\beta$ is the propagation constant
  $\omega$ is the frequency
  t is time
  z is the axial distance
  r,$\phi$ is the polar trans-axial position along the fiber. Single-mode fibers support just one order of bound mode known as the fundamental-mode which we denote as $\psi_{01}$, and which is often referred to in the literature as $LP_{01}$. The transverse field dependence for the fundamental-mode in the vicinity of the core may be approximated by a gaussian function as $$\psi_{01}(r,\phi) = \exp \{-(r/r_{01})^2\}$$

Where $r_{01}$ is the fundamental-mode spot size. Two-mode fibers support two orders of mode. In addition to the fundamental-mode, two-mode fibers support a second order of bound mode which we denote as $\psi_{11}$, and which is often referred to in the literature as $LP_{11}$. The transverse field dependence of the second order modes in the vicinity of the core may be approximated as $$\psi_{11}(r,\phi) = r \exp \{-(r/r_{11})^2\} f_1(\phi)$$

where $r_{11}$ is the second-mode spot size
  $f_1(\phi)$ is the rotation of the pattern described by
  $f_1(\phi) = \cos(\phi)$ or $\sin(\phi)$,
and the other variables and constants are as described above. The optical fields of second modes spread out further into the cladding, and require fibers with a larger optical fiber core diameter and/or core-cladding index of refraction difference to reduce attenuative effects, compared to fundamental-mode waves, which have less spread in their field patterns, and hence can propagate in optical fibers with smaller core diameters and/or core-cladding index of refraction differences.

While the above equations describe fundamental and second-mode waves in their most common mathematical forms, it is clear to one skilled in the art that other two-mode wave systems are available for separation and aggregation on the basis of modal characteristic, among which (a) the first two Transverse Electric (or Transverse Magnetic) modes of planar waveguides commonly known as $TE_0$ and $TE_1$ (or $TM_0$ and $TM_1$), (b) two polarizations of a given order of mode such as (i) planar waveguide modes $TE_0$ and $TM_0$, and the polarized optical fiber modes known as $LP_{01}^x$ and $LP_{01}^y$, as well as (c) the higher level modes of the waves described here and in the publications and patents cited herein, all of which are incorporated by reference.

Fiber optic filters are well known in the art, and may be constructed using a combination of optical fiber and gratings. Using fiber of the previously described type, there are several techniques for creating fiber optic gratings. The earliest type of fiber grating-based filters involved gratings external to the fiber core, which were placed in the vicinity of the cladding as described in the publication "A single mode fiber evanescent grating reflector" by Sorin and Shaw in the Journal of Lightwave Technology LT-3:1041–1045 (1985), and in the U.S. Pat. Nos. by Sorin 4,986,624, Schmadel 4,268,116, and Ishikawa 4,622,663. All of these disclose periodic gratings which operate in the evanescent cladding area proximal to the core of the fiber, yet maintain a separation from the core. A second class of filters involve internal gratings fabricated within the optical fiber itself. One technique involves the creation of an in-fiber grating through the introduction of modulations of core refractive index, wherein these modulations are placed along periodic spatial intervals for the duration of the filter. In-core fiber gratings were discovered by Hill et al and published as "Photosensitivity in optical fiber waveguides: Application to reflected filter fabrication" in Applied Physics Letters 32:647–649 (1978). These gratings were written internally by interfering two counter propagating electromagnetic waves within the fiber core, one of which was produced from reflection of the first from the fiber endface. However, in-core gratings remained a curiosity until the work of Meltz et al in the late 1980s, who showed how to write them externally by the split-interferometer method involving side-illumination of the fiber core by two interfering beams produced by a laser as described in the publication "Formation of Bragg gratings in optical fibers by a transverse holographic method" in Optics Letters 14:823–825 (1989). U.S. Pat. Nos. Digiovanm 5,237,576 and Glenn 5,048,913, also disclose Bragg gratings, a class of grating for which the grating structure comprises a periodic modulation of the index of refraction over the extent of the grating. Within this class of in-fiber gratings, most of the art is directed to in-fiber gratings having the Bragg plane of refractive index modulation perpendicular to the principal axis of the core of the fiber optic cable. A new class of grating involves in-fiber gratings with an angular offset in the plane of refractive index modulation. This type of angled grating is referred to as a mode-converting two-mode grating, and, with properly chosen angle, has the property of converting fundamental-mode power into second-mode power and visa versa. Whether internal or external, both types of gratings can be fabricated as short-period gratings, or long-period gratings. Short-period gratings reflect the filtered wavelength into a counter-propagating mode, and, for silica based optical fibers, have refractive index modulations with periodicity on the order of a third of the wavelength being filtered. Long-period gratings have this modulation period much longer than the filtered wavelength, and convert the energy of one mode into another mode propagating in the same direction, i.e., a co-propagating mode, as described in the publication "Efficient mode conversion in telecommunication fibre using externally written gratings" by Hill et al in Electronics Letters 26:1270–1272 (1990). The grating comprises a periodic variation in the index of refraction in the principal axis of the core of the fiber, such variation comprising a modulation on the order of 0.1% of the refractive index of the core, and having a period associated with either short or long-period gratings, as will be described later.

Fiber-optic add-drop filters are a class of filter of particular interest in multi-wavelength communications and sensor systems, and are used for adding a wavelength channel to or dropping a wavelength channel from an optical fiber bus carrying signals consisting of multiple wavelength channels.

Optical fiber couplers are well known in the art, and generally comprise two fibers as described above having their jackets removed and bonded together with claddings reduced so as to place the fiber cores in close axial proximity such that energy from the core of one fiber couples into the core of the adjacent fiber. There are currently two main ways of practicing this coupling, as well as a third less-used technique. The first method is the side-polished coupler, wherein the cladding material from each fiber is removed through a mechanical polishing operation, followed by a bonding of the two polished claddings together to allow evanescent coupling between the fiber cores. Generally, these couplers are fabricated from a pair of single-mode, or a pair of multi-mode fibers. The side-polished class of fiber optic coupler is described in publications "Single-mode Fibre Optic Directional Coupler" by Bergh, Kotler, and Shaw in Electronics Letters, 16(7)(1980), and "Determination of Single-mode Fiber Coupler Design Parameters from Loss Measurement" by Leminger and Zengerle in the IEEE Journal of Lightwave Technology, LT-3:864–867 (1985). A new class of side-polished mode-converting couplers is described in "Highly selective evanescent modal filter for two-mode optical fibers" by Sorin, Kim and Shaw in Optics Letters 11:581–583 (1986). This class of coupler is fabricated by polishing and bonding a single-mode fiber with a two-mode fiber. As will be described later, this mode-converting coupler converts fundamental-mode waves in a single-mode fiber into second-mode waves, which are principally coupled into the two-mode fiber. A second method of fabricating optical couplers is a fused tapered coupler wherein the two fibers are placed in close proximity, heated, and drawn together. The fused tapered class of coupler is described by Hill et al in "Optical fiber directional couplers: biconical taper technology and device applications", Proceedings SPIE 574:92–99 (1985) with analysis of their operation given in Bures, Lapierre, Lacroix "Analyse d'un coupleur bidirectionnel a fibres optiques monomodes fusionnees" in Applied Optics 22:1918–1921 (1983).

The third method of making couplers involves etching the cladding as described in § Single-mode power divider: encapsulated etching techniques§ by Sheem and Giallorenzi in Optics Letters 4(1):29–31 (1979). Because of reciprocity, optical couplers fabricated from single-mode fiber are intrinsically power-splitting reciprocal devices. The most commonly used coupler involves two coupled single-mode fibers and thus is intrinsically a 4 port device. If such a coupler is used to extract the wavelength band reflected by a single-mode grating, then, because of splitting-loss for the two traversals of non-mode-converting coupler (before and after reflection by the grating), a maximum peak power that can be extracted is 25% of the peak power that would be reflected without the coupler in the system. This least loss case involving approximately 6 dB loss is for a 50/50 splitter known as a 3 dB coupler. Cascaded couplers of this type are frequently used in single-mode systems, and the losses can become quite high, and increase for each optical coupling event, as computed for one such system in the publication "Analysis of the reflective-matched fiber Bragg grating sensing interrogation scheme" by Ribeiro et al in Applied Optics 36:934–939 (1997).

SUMMARY OF THE INVENTION

The present invention is directed towards a new class of filtering devices which involves bidirectional conversion between two optical waveguide modes as well as mode-dependent routing to (a) circumvent the splitting loss problem associated with coupling reflected energy out of single-mode waveguides using single-mode couplers, (b) allow efficient addition/dropping of wavelength channels to/from a primary waveguide from/to a secondary waveguide, and (c) provide a basis for modal processing and modal logic systems. The invention is illustrated with respect to the fundamental and second-mode waves in optical fibers using optical elements comprising optical gratings and optical couplers, all fabricated using optical fiber. A first objective of the invention is low loss conversion from the second-mode to the fundamental-mode. A second objective of the invention is low loss conversion from the fundamental-mode to the second-mode. A third objective is the efficient wavelength-dependent extraction of the converted mode into a second fiber using a mode-splitting two-mode coupler to provide the basis for an add-drop filter. A fourth objective is the creation of a wavelength-division multiplexed optical system. Objectives one and two can be achieved with mode-converting two-mode gratings. Methods of realizing objectives three and four include (a) in an all-two-mode-fiber system or subsystem, combining a mode-splitting two-mode coupler with a mode-converting two-mode grating, and (b) in a single-mode-fiber system or subsystem, adding a two-mode-fiber tapping section with a mode-converting grating between two mode-converting single-to-two-mode couplers.

DETAILED DESCRIPTION OF THE INVENTION

Figure 1A:
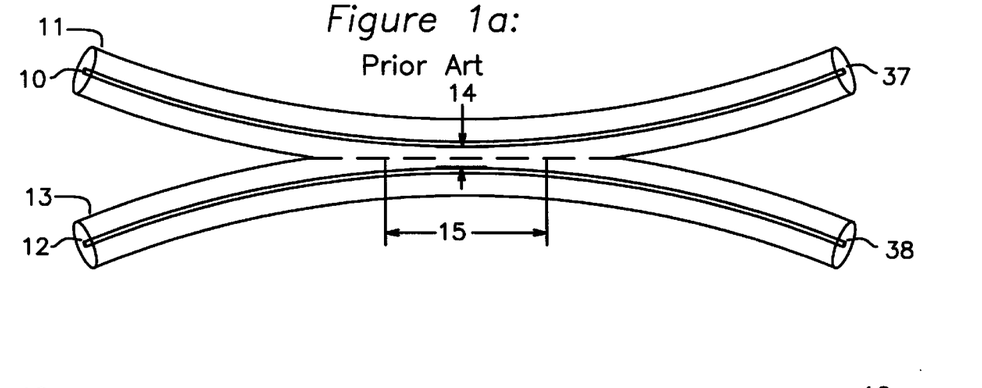
FIG. 1a is the plan view of a prior art side polished fiber coupler.

Referring now to FIG. 1a, there is shown a prior art single-mode optical coupler. For reference, we first examine the characteristics of the single-mode fiber itself. Core 10 and cladding 11 have respectively dimensions of approximately 10 $\mu$m and 125 $\mu$m, and a ratio of refractive index in the range of 1.001. The protective plastic jacket is not shown as it is typically removed during the process of fabricating the coupler. The coupler is fabricated from a first fiber comprising a core 10 and cladding 11, which is placed adjacent to a second fiber also having a core 12 and cladding 13. There are two methods commonly used to create this adjacency. The first method is side polishing wherein two fibers 11 and 13 are placed in a fixture and a flattened surface is created through the polishing and reduction of claddings 11 and 13, and the two side polished fibers are then placed with side polished surfaces in contact with each other as shown in FIG. 1a. Usually, fibers 11 and 13 are of the same type: either both are single-mode or both are multimode. For a simple single-mode coupler carrying fundamental-mode waves, the energy transfer from a wave presented to port 10 and coupling to port 38 depends on length 15 and proximity 14, and can vary from 0% to 100%. For the case of a mode-converting coupler where core 10 is single-mode fiber and core 12 is two-mode fiber, a fundamental-mode wave presented at port 10 would convert into a second-mode wave within the interface region 15, and in the ideal case, negligible fundamental-mode wave energy would appear at port 37, and all of the converted second-mode waves would be present at port 38. Fundamental-mode wave energy presented to port 38 would not mode-convert, and would appear unmodified at port 12. By duality, second-mode wave energy presented at port 38 would convert to fundamental-mode wave energy appearing at port 10.

Figure 1B:
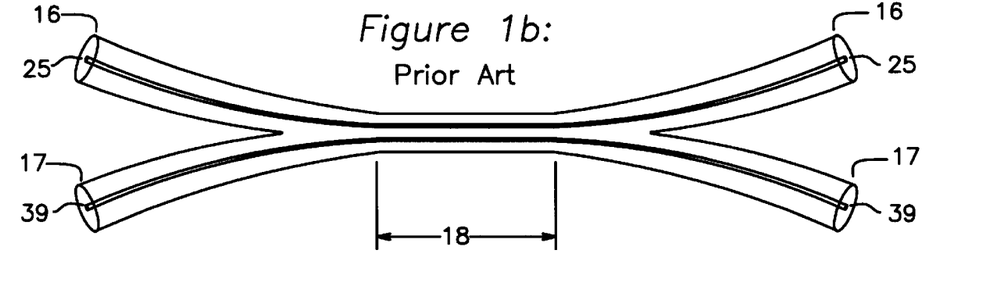
FIG. 1b is the plan view of a prior art fused tapered fiber coupler.
Figure 1C:
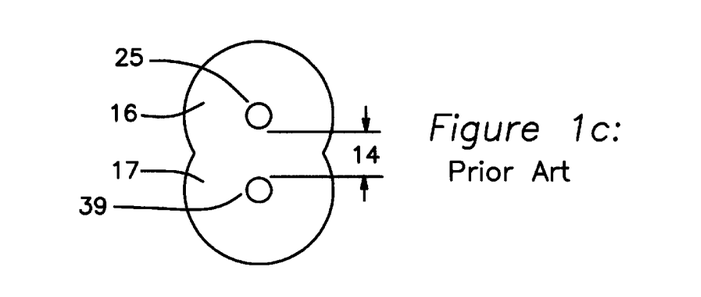
FIG. 1c is a section view of a prior art optical coupler.

The second method of fabricating an optical coupler is to place two fibers 16 and 17 together and heat and draw them as shown in FIG. 1b, thereby necking the claddings 16 and 17, and respective cores 25 and 39, and creating a region of adjacency 18. Most modern couplers are fabricated through the process of heating and drawing the first fiber 16 along with the second fiber 17, until the cross section of the new fused section resembles FIG. 1c, which shows fused claddings 16 and 17, and diameter-reduced cores 25 and 39. Coupling ratios are controlled by both the length of core coupling 18 and core separation distance 14. Typical values vary widely, but may be found to be 10 mm for coupling length 15 and on the order of one to several microns for distance 14. While the process of fabricating a two-mode coupler has been described using fusing of elements, it should be clear to one skilled in the art that any other method of fabrication which places the fiber cores in proximity within the cladding will produce the described two-mode coupler, and such methods include etching, and many other mechanical and chemical means. It has been observed that the coupling function between the two fibers changes with drawing distance and proximity.

For clarity, we will now define the three classes of couplers relevant to this invention. Prior art optical couplers which couple energy from the fundamental mode of a single-mode fiber to the fundamental mode of another single-mode fiber will be referred to as simple optical couplers. Prior art optical couplers which convert from one mode to another will be referred to as mode-converting couplers. The present invention is an optical coupler which selectively couples energy of only one of the two modes of two-mode fiber to the same mode of a second two-mode fiber and will be referred to as mode-splitting two-mode coupler or simply a two-mode coupler.

Figure 2:
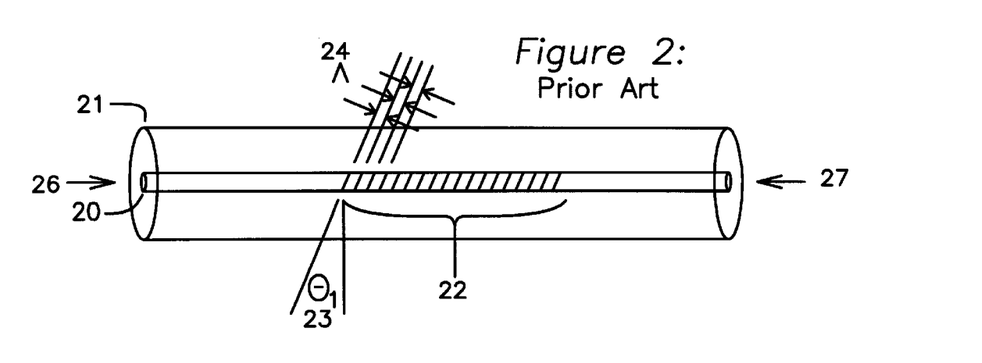
FIG. 2 is a prior art in-fiber two-mode grating.

FIG. 2 shows an in-fiber grating. Core 20 is surrounded by cladding 21, and a modulated index of refraction region 22 is created in the bulk of the core 20 through a variety of techniques, such as exposure to a laser beam with periodically varying intensity along the grating. In the case where angle 23 is 0°, the principal effect of the grating is to reflect the fundamental mode into the counter-propagating version of itself rather than the conversion of modes. With regard to the period of the grating 22, there are two distances in which the grating period may be set for a desired filter function. For transmission of waves through the grating at wavelength $\lambda_b$, the long-period grating function is as follows:

$$\Lambda_b = \lambda_b/(n_1 - n_2)$$

where $\Lambda_b$=pitch of the desired Bragg grating,
$\lambda_b$=wavelength to reflect,
$n_1$=effective index of refraction of the first mode,
$n_2$=effective index of refraction of the second-mode.

In the case of a reflected wave returning to the entry port, a sign reversal occurs for $n_2$, wherein the formula becomes for the short-period grating:

$$\Lambda_b = \lambda_b/(n_1 + n_2)$$

Figure 3A:
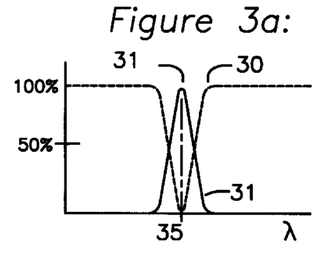
FIGS. 3a–c shows power transfer curves for a mode-converting two-mode grating.

FIG. 3a is a diagram showing this filtering action for a short-period grating and a fundamental-mode source. For a spectrally flat excitation into input port 26, the resulting transmitted wave energy spectrum is shown as curve 30, while the reflected wave energy is shown as curve 31. It should be noted that this type of filter is capable of very low transmissive and reflective losses. As can be seen, for short-period gratings, the overall behavior is that of a band pass filter for wave energy reflecting back to the input port 26, and a notch filter for wave energy passing on to the output port 27. As the grating is longitudinally and axially symmetric, the labeling of input and output ports is arbitrary, although it would be possible to fabricate a grating without such symmetry to achieve other filtering effects.

Figure 3B:
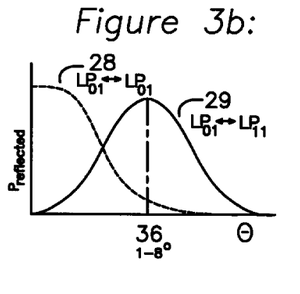
Figure 3C:
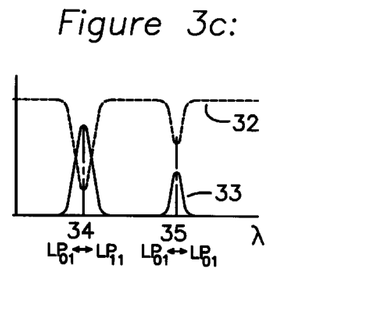
Figure 3D:
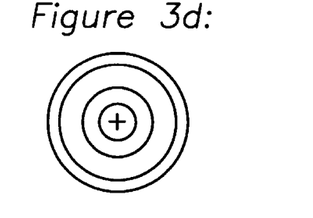
FIGS. 3d–3g shows modal wave energy patterns.
Figure 3E:
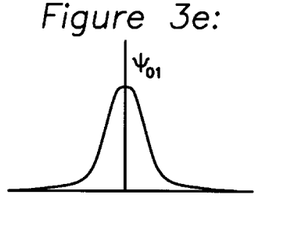
Figure 3F:
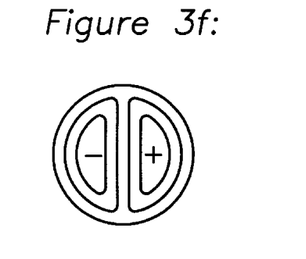
Figure 3G:
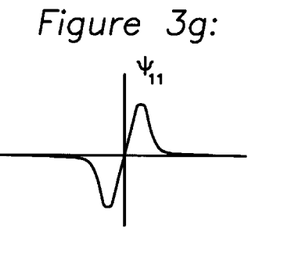

Examining now the effect of changing the angle of modulation, FIG. 3b shows the mode conversion property of the grating 22 as the angle 23 is increased. Referring now to FIG. 3b, the effect of angle Θ 23 is seen in the power reflected at the operating wavelength λ. For single-mode input excitation, curve 28 shows fundamental-mode power reflected as a function of grating angle Θ, while curve 29 shows second-mode power reflected as a function of grating angle Θ. As can be seen from the curves, at the experimentally determined grating angle Θ 36=1–8°, maximum transfer of power from fundamental-mode to second-mode occurs. It is clear that the optimum angle for modal power transfer will vary with different materials, but this is what is observed for commercially available germanium doped silica glass fiber. Given this modal conversion property of the fiber, it can be seen that a fundamental-mode source will return a mixture of fundamental-mode and second-mode energy. FIG. 3c shows this effect for a short-period two-mode grating excited at port 26 by a fundamental-mode source. Reflected power curve 33 now shows two peaks. Reflected fundamental-mode power peak 35 remains at a similar wavelength as from FIG. 3a, but a new reflected power peak at wavelength 34 represents second-mode reflected power created by the two-mode grating 22. Transmitted power curve 32 represents the power transmitted to port 27, and as in the case of the single-mode grating, minimal losses occur. FIG. 3d shows the optical fiber cross section plot of the field magnitude of a fundamental-mode wave pattern $\Psi_{01}$, and FIG. 3e is the corresponding amplitude plot for such a wave. FIG. 3f shows similarly the optical fiber cross section plot of the second-mode wave amplitude for the $\Psi_{11}$ wave pattern, and FIG. 3g is the wave magnitude plot.

Figure 4A:
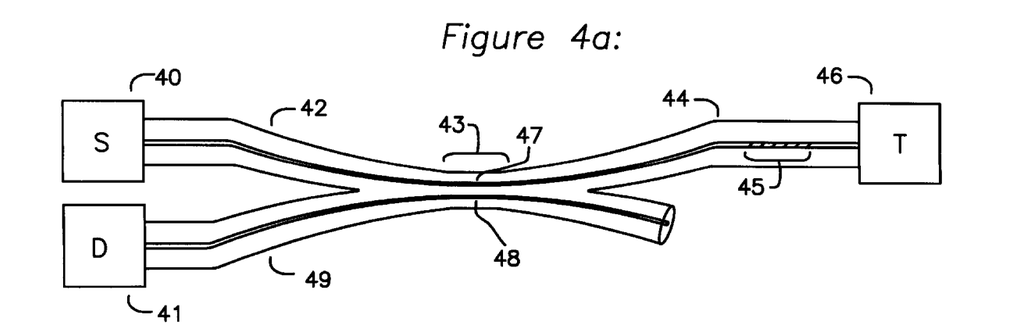
FIGS. 4a–b are the mode-converting wavelength-selective filters.

FIG. 4a discloses a key form of the present invention, comprising a two-mode fiber first port 40, two-mode fiber 42 leading to mode-splitting two-mode optical coupler 43, another length of two-mode fiber 44 terminating in short-period mode-converting two-mode grating 45. One port of two-mode coupler 43 is coupled to the wavelength-selective port 41, which has a second-mode output which is obtained by conversion by the grating of the fundamental-mode optical energy from the input source 40. It will be seen that if fundamental-mode wave energy is provided to first port 40, in general, the power reflected by short-period grating 45 with arbitrary grating angle Θ 36 will be a mixture of fundamental-mode and second-mode energy, and the second-mode energy will selectively be coupled by two-mode coupler 43 into fiber 48, and conducted to output port 41, which will be found to contain mostly converted second-mode energy. Conversely, if second-mode energy is provided at port 41, then it will be selectively coupled across two-mode coupler 43 and directed along fiber 44 to short-period two-mode grating 45, wherein the grating will convert such second-mode waves to fundamental-mode waves reflected back to input port 40 via fiber 42. In accordance with the low coupling of fundamental-mode waves across two-mode coupler 43, virtually all of the fundamental-mode wave power reflected by grating 45 will be sent back to port 40. However, in the case where two-mode grating 45 optimized for maximum reflection of second-mode waves compared to fundamental-mode waves, port 46 is an auxiliary port for measurement, and will contain wave energy not reflected by grating 45.

Figures 4B, 5:
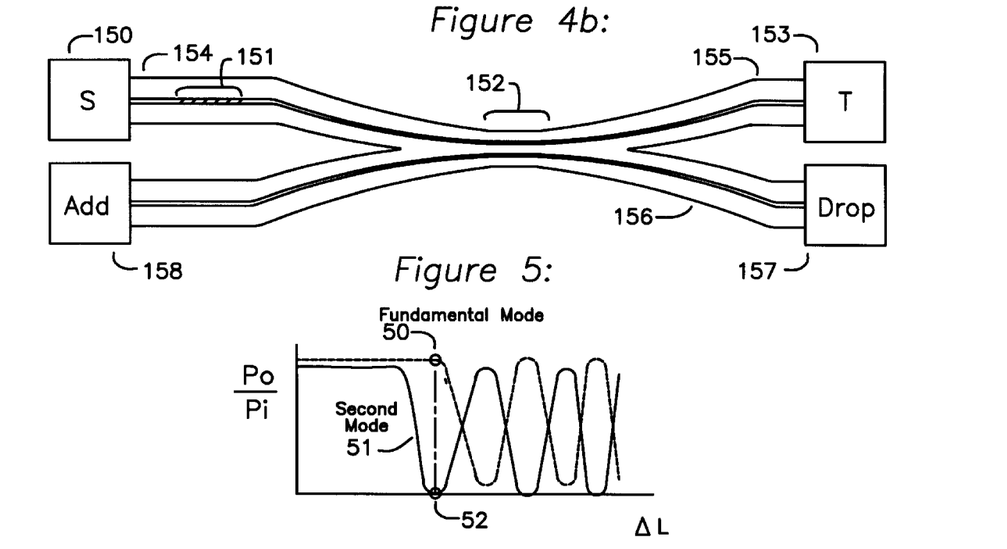
FIG. 5 is the optical coupling characteristic of the mode-splitting two-mode coupler.

FIG. 4b illustrates this same filter device fabricated using long-period mode-converting grating 151. Fundamental-mode waves from source 150 travel through fiber 154, and waves at mode-converting wavelength $\lambda_n$ are converted from fundamental-mode to second-mode waves but continue to propagate towards two-mode coupler 152. Waves not at mode-converting wavelength $\lambda_n$ continue to two-mode coupler 152 without any mode change. Two-mode coupler 152 then couples second-mode waves at wavelength $\lambda_n$ into drop port 157, while non-mode converted fundamental-mode waves continue along fiber 155 to port 153. Second-mode waves furnished to add port 158 couple to fiber 155 in two-mode coupler 152 and travel on to output port 153.

An important feature of the optical two-mode coupler is shown in FIG. 5. It was disclosed earlier that one method of fabricating optical couplers involved placing them in proximity to each other and drawing them under elevated temperature. FIG. 5 shows the fundamental-mode transfer function 50 through a first fiber as a function of drawing distance Δl. Also shown is the second-mode transfer function 51 for the same fiber drawn distance Δl. The critical point $l_{opt}$ 52 shows the optimum drawing distance where the second-mode energy reflected by the grating 45 and traveling back to the source 40 in fiber 44 is selectively coupled such that the second-mode wave coupling to fiber 49 is at a maximum, while the second-mode energy remaining in fiber 42 and returning to the source 40 is at a minimum, while virtually all of the fundamental-mode energy continues from 44 to 42 without appreciably coupling to 49. The effect of stopping the drawing process at this critical point creates a mode filter acting on the reflected second-mode energy which passes with minimal attenuation fundamental-mode wave energy, while filtering second-mode wave energy onto the second fiber 49.

In practice, fabrication of the add-drop filter requires all elements of FIG. 4a or 4b to be present, and while port 40 or 150 is illuminated with a fundamental-mode source, the two-mode fibers 47 and 48 comprising the two-mode coupler 43 or 152 are heated and drawn while power is measured at port 41 or 157. At first, no appreciable power is measured at port 41 or 157, and as the claddings begin to fuse, some coupling of power is observed, and as the drawing process begins, a point is reached where second-mode power is maximally coupled to port 41 or 157. At this point, the drawing process stops, as point 52 has been identified, and the add-drop filter is now optimized.

Figure 6A:
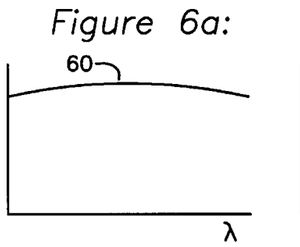
FIGS. 6a–6c are a set of spectral density plots for power found at various ports of the mode-converting wavelength-selective filter.
Figures 6B, 6C:
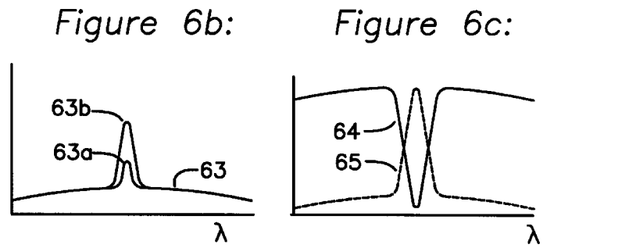

FIG. 6a shows the typical power density spectrum 60 of a broadband fundamental-mode source such as an LED (light emitting diode), which is coupled into port 40. FIG. 6b shows the typical power density spectrum 63 measured at 41 before fusing of element 43 begins, and also shows the progression in spectral density 63a, 63b during fusing and drawing. As more wave energy couples into fiber 48, curves 63a and 63b begin to reflect this increased power level. Curve 65 in FIG. 6c shows the final power density spectrum at the critical coupling point 52, and is the point at which forming of two-mode coupler 43 is terminated. Curve 64 shows the power delivered to port 46.

Figure 7:
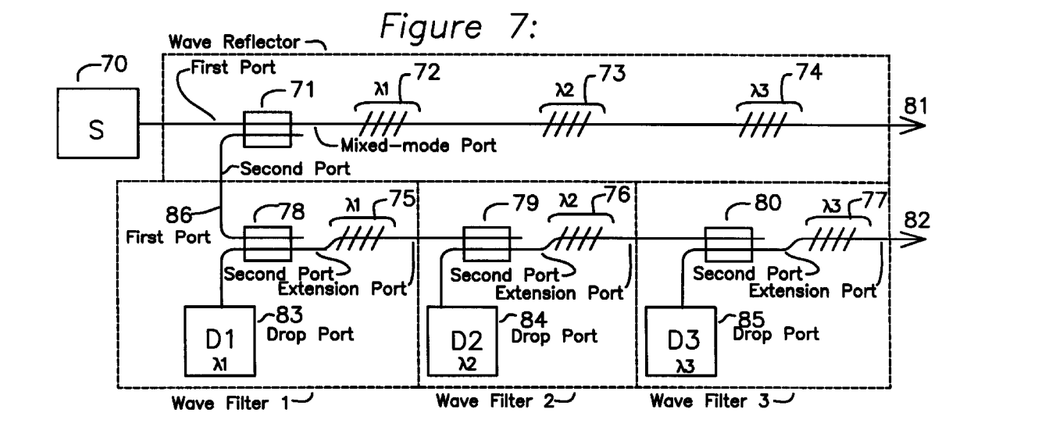
FIG. 7 is a wavelength division multiplexer/demultiplexer using mode-splitting two-mode couplers and two-mode gratings.

Referring now to FIG. 7, a multi-wavelength add-drop filter is shown constructed from the previously disclosed elements. Two-mode couplers 71, 78, 79, and 80 are shown, as are two-mode gratings 72, 73, 74, which are chosen to convert and reflect fundamental-mode waves, as are gratings 75, 76, and 77, which are matched in characteristics respectively to the gratings 72, 73, and 74. Fundamental-mode source 70 produces a broadband excitation to two-mode coupler 71, which passes these fundamental-mode waves to first, second, and third wavelength gratings 72, 73, and 74 respectively. Gratings 72, 73, and 74 reflect and convert to second-mode waves at first, second, and third wavelengths respectively, which are coupled to fiber 86, and coupled to mode-splitting two-mode coupler 78. Second-mode waves at wavelength $\lambda_1$ are reflected and converted by grating 75 into fundamental-mode waves at a first wavelength, and are wholly presented to first port 83, while the second and third wavelength second-mode waves continue on past grating 75 through two-mode coupler 79 and on to grating 76 wherein second wavelength second-mode waves are reflected and converted, and are presented at port 84. Similarly, third wavelength second-mode waves are converted and reflected to port 85. As should be clear to one skilled in the art, as long as gratings 72 and 75 are matched to each other, as are gratings 73 and 76, and gratings 74 and 77, the add-drop filter may be extended at ports 81 and 82 to include an arbitrary number of additional ports. We may also refer to the operation of such as system as a frequency de-multiplexer, having the property of separating an aggregate of wavelengths into individual components.

Furthermore, the system may also be used as a frequency multiplexer. If individual sources at first, second, and third wavelengths are presented to ports 83, 84, and 85 respectively on a multiplexer, then port 70 will be found to be an aggregate of these wavelengths. These signals could be transported some distance over a single fiber to a separate demultiplexer as initially described having port 70 as an input, and outputs at ports 83, 84, and 85 containing the de-multiplexed wavelengths that were presented on ports 83, 84, and 85 of the multiplexer.

Another use for such a system would be for multi-point sensing wherein the gratings 72, 73, 74, and any successor gratings on port 81 are each placed as individual sensors in a system for measuring tensions applied to these sensor gratings or for measurements which through some transducer material applies equal amounts of tensions to these gratings. As the Bragg wavelength is changed by such a physical change in length and index of refraction, and the characteristics of the fiber gratings are well-matched, the amount of tension in sensors 72, 73, and 74 could be determined by applying a broadband fundamental-mode source at 70, and varying known tensions applied to each element 75, 76, and 77 until a maximum output power is found at respective ports 83, 84, and 85, indicating a match between tensions in gratings 72 and 75, 73 and 76, 79 and 77, and so forth.

Figure 8:
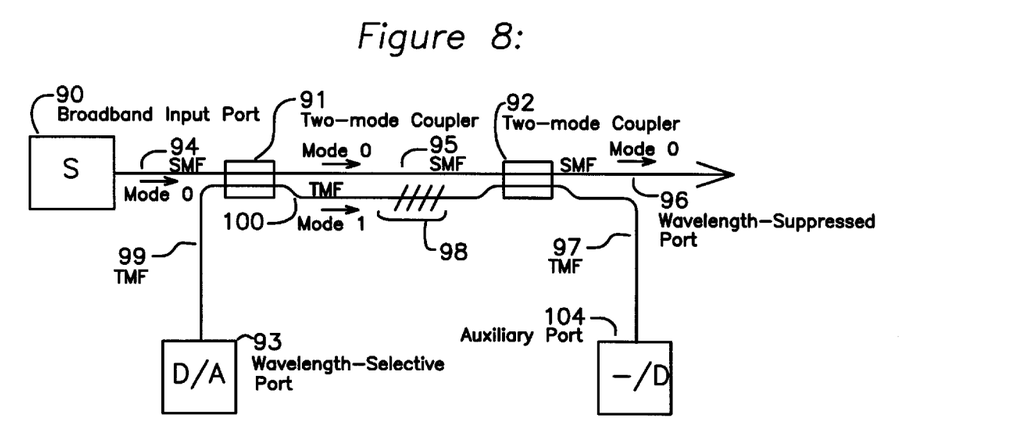
FIG. 8 is a filter using mode-converting couplers and a two-mode grating.

FIG. 8 shows a filter based on mode-converting couplers 91 and 92 and short-period two-mode grating 98. The single-mode fiber sections 94, 95, and 96 carry exclusively fundamental-mode waves, while two-mode fibers 99, 100, and 97 carry fundamental-mode waves on fiber 99, second-mode waves on fiber 97, and a mixture of fundamental and second-mode waves on 100. Broadband fundamental-mode source 90 injects waves through fiber 94 into mode-converting coupler 91. Converted second-mode waves exit via fiber 100 into short-period two-mode grating 98, where these second-mode waves are converted back to fundamental-mode waves, reflected at Bragg wavelength $\lambda_1$, and presented to mode-converting coupler 91, which carries them through to two-mode fiber 99 to detector 93. Second-mode waves not at the Bragg wavelength $\lambda_1$ continue to mode-converting coupler 92, where they are converted back to fundamental-mode waves and exit at port 96, which also carries minimal fundamental-mode wave energy not converted by 91 along fiber 95. Port 96 carries fundamental-mode wave energy not filtered at $\lambda_1$ to subsequent filters.

Examining again FIG. 8 for the case where two-mode grating 98 is long-period, we will see that port 93 becomes an add port, and new port 104 becomes a drop port. As described earlier, the single-mode fiber sections 94, 95, and 96 carry exclusively fundamental-mode waves, while two-mode fibers 99, 100, and 97 carry fundamental-mode waves on fiber 99, second-mode waves on fiber 97, and a mixture of fundamental and second-mode waves on 100. Broadband fundamental-mode source 90 injects waves through fiber 94 into mode-converting coupler 91. Converted second-mode waves exit via fiber 100 into long-period two-mode grating 98, where these second-mode waves are converted back to fundamental-mode waves at Bragg wavelength $\lambda_1$, and presented to mode-converting coupler 92, where they carries them through to two-mode fiber 97 to drop port 104. Second-mode waves not at the Bragg wavelength $\lambda_1$ continue to mode-converting coupler 92, where they are converted back to fundamental-mode waves and exit at port 96, which also carries minimal fundamental-mode wave energy not converted by 91 along fiber 95. Port 96 carries fundamental-mode wave energy not filtered at $\lambda_1$ to subsequent filters. Add port 93 analogously carries fundamental-mode waves at $\lambda_1$ through fiber 99, which continue along fiber 100 to long-period two-mode grating 98, where they convert to second-mode energy for wavelength $\lambda_1$, and convert back to fundamental-mode, exiting at port 96.

Figure 9A:
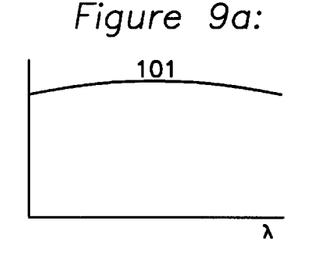
FIGS. 9a,b, and c are spectral density plots for power found at various ports of the filter of FIG. 8.
Figure 9B:
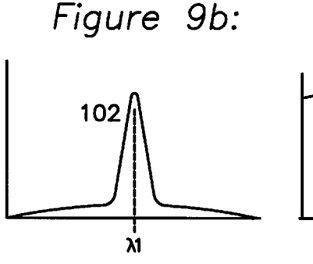
Figure 9C:
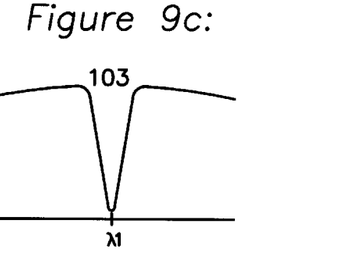

FIG. 9a shows the spectrum 101 of broadband source 90, while FIG. 9b shows the spectrum 102 presented to detector 93 peaking at Bragg grating 98 wavelength $\lambda_1$. FIG. 9c shows the spectrum 103 of fundamental-mode wave power at port 96, which contains the spectral power of 101 less the power at port 93 as shown by curve 102. As is clear from these figures, the power loss in the system is minimal compared to the losses of prior art systems not converting between fundamental and second-mode waves, and while the conversions are occurring internal to the filters, the wave energy presented external to the filter is entirely fundamental-mode, in accordance with current practice in the communications industry. Note that while port 93 is used for a wavelength channel $\lambda_1$ dropped from the signal passing from 90 to 96, port 104 can be used for adding a signal at wavelength $\lambda_1$ to the signal passing from 90 to 96.

Figure 10:
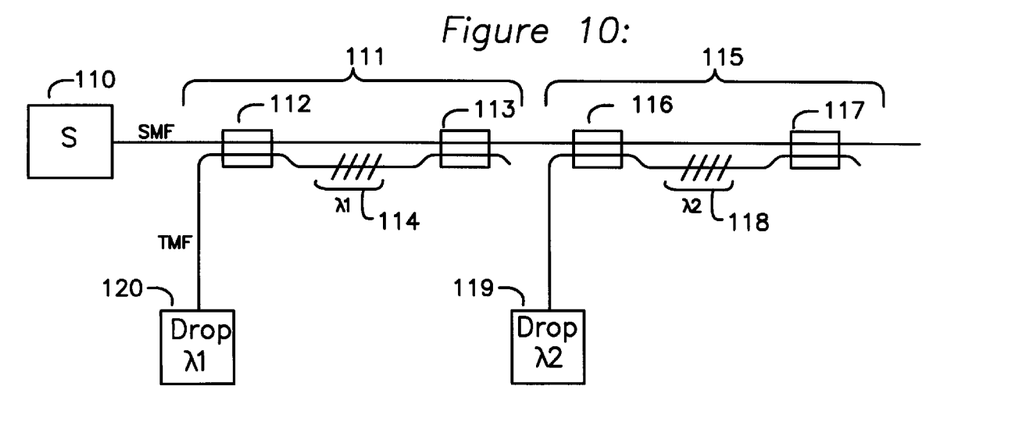
FIG. 10 is a wavelength division multiplexer/demultiplexer using mode-converting couplers and two-mode gratings.

FIG. 10 shows a cascaded add-drop filter using the previously described elements. Filter 111 operates at wavelength $\lambda_1$ determined by short-period mode-converting Bragg filter 114, while filter 115 operates at wavelength $\lambda_2$ determined by short-period mode-converting Bragg filter 118. Mode-converting couplers 112 and 113, as well as 116 and 117, function analogously and respectively as mode-converting couplers 91 and 92 described in FIG. 8. Detector 120 receives fundamental-mode waves at $\lambda_1$, and detector 119 receives fundamental-mode waves at $\lambda_2$. Duality further enables the injection of fundamental-mode waves at $\lambda_1$ and $\lambda_2$ at ports 120 and 119 respectively, and a loss-free summation of these fundamental-mode waves would appear at port 110. A multiplexer/de-multiplexer could be then created analogously as that described in FIG. 7.

Figure 11:
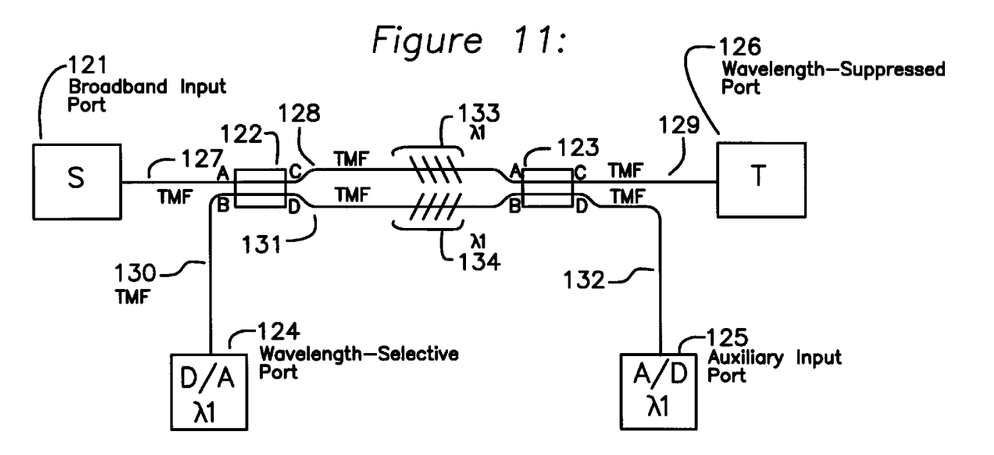
FIG. 11 is an add-drop wavelength filter using two mode-splitting two-mode couplers connected by two two-mode gratings.

FIG. 11 is an add-drop filter which is a doubled-up back-to-back version of the short-period grating filter of FIG. 4a to allow dropping a given wavelength to port 124 from the throughput signal passing from two-mode source 121 to wavelength suppressed transmission port 126 independent of the mode excited at 121, and adding a given wavelength from add port 125 to the said throughput signal exiting at transmission port 126. This filter comprises two mode-separating two-mode couplers 122 and 123 connected via two short-period mode-converting gratings 133 and 134. In particular, mixed fundamental and second-mode source 121 is connected to two-mode fiber 127 which leads to two-mode optical coupler 122, another section of two-mode fiber 128 containing short-period two-mode grating 133, two-mode coupler 123, two-mode fiber section 129 terminating in transmission port 126. The drop port is connected to two-mode fiber section 130 which leads to two-mode optical coupler 122, another section of two-mode fiber 131 containing short-period two-mode grating 134, two-mode coupler 123, two-mode fiber section 132 connected to add port 125. It will be seen that if fundamental and second modes are excited at port 121, the fundamental-mode will pass through coupler 122 to be reflected by mode-converting grating into the second-mode at wavelength $\lambda_1$ which will pass back along two-mode fiber section 128, be coupled by two-mode coupler 122 to two-mode fiber section 130 terminating in wavelength-selective drop port 124, and the second-mode will be coupled from two-mode fiber section 127 to section 131, reflected by grating 134 into the fundamental-mode at wavelength $\lambda_1$ which will pass backward through two-mode coupler 122 to two-mode fiber section 130 again terminating in wavelength-selective drop port 124. For other wavelengths outside the grating reflection band, power will pass from source 121 to transmission port 126 (a) in the case of the fundamental-mode, via two-mode fiber sections 127, 128 and 129, and (b)in the case of the second-mode, via two-mode fiber sections 127, 134 and 129. Inputting power at wavelength $\lambda_1$ at the add port 125: (a) the fundamental-mode will pass from fiber section 132 through two-mode coupler 123 to grating 133 to be converted into reflected second-mode which will then be coupled by two-mode coupler 123 to fiber section 129 and thus pass to transmission port 126 together with any signal passing from 121 to 126; (b) the second-mode will be coupled from fiber section 132 by two-mode coupler 123 to grating 133 to be reflected into the fundamental-mode which will then pass back through two-mode coupler 123 to fiber section 129 and thus pass to transmission port 126 and also be added to any signal passing from 121 to 126.

Examining once again FIG. 11 for the case where long-period two-mode gratings 133 and 134 are used instead of the earlier described short-period gratings, we will see that the system behavior is similar to the short-period case, however port 124 becomes the add-port, and port 125 becomes the drop port. Examining FIG. 11 in detail, source 121 delivers a mixture of fundamental and second-mode waves to two-mode fiber 127. Second-mode waves couple to fiber 131 and to long-period grating 134, where waves at $\lambda_n$ are converted to fundamental-mode and continue through fiber 132 to drop port 125. Fundamental-mode waves from 121 travel through fiber 128 to long-period two-mode grating 133 and are converted at $\lambda_n$ to second-mode waves which cross over to fiber 132 in two-mode coupler 123, and are delivered to drop port 125. As can be seen, drop port 125 has both fundamental and second-mode waves at $\lambda_n$ as were present at input port 121. Adding fundamental and second-mode waves to add port 124 causes fundamental-mode waves to continue to grating 134, which convert at $\lambda_n$ to second-mode waves coupling across two-mode coupler 123 and to output port 126. Second-mode waves at add port 124 couple to fiber 128, are converted at $\lambda_n$ to fundamental-mode waves in grating 133, and continue through coupler 123 on to output port 126. As can be seen, the symmetry of FIG. 11 ensures that the add/drop ports 124 and 125 offer desired filtering at $\lambda_n$ while eliminating the requirement for modally pure excitation sources at input or add ports. Fundamental-mode waves not at $\lambda_n$ from source 121 simply continue on to output port 126 without coupling, while second-mode waves not at $\lambda_n$ from source 126 couple first to fiber 131, and then back to fiber 129 to output port 126.

We claim:

1. A mode insensitive filter having a broadband input, a wavelength-suppressed output, a wavelength-selective output, and an auxiliary input, comprising a first and second two-mode coupler wherein each of said two-mode couplers has an A, B, C, and D port; said A and said C ports bidirectionally passing fundamental-mode waves to each other without substantial coupling said fundamental-mode waves to any other port, said B and said D ports bidirectionally passing fundamental-mode waves to each other without substantially coupling to any other port, said A port and said D port bidirectionally coupling substantially all second-mode waves to each other without substantially coupling any said second-mode waves to any other port, and said B port and said C port bidirectionally coupling substantially all second-mode waves to each other without substantially coupling any said second-mode waves to any other port;

a first and second two-mode long-period grating each having A and B ports, said two-mode grating converting second-mode wave energy presented to said A port into fundamental-mode waves at wavelength $\lambda_n$, and disposing said fundamental-mode waves to said two-mode grating B port, while passing second-mode waves of all other wavelengths to said two-mode grating B port as second-mode waves, said two-mode grating also converting and disposing second-mode wave energy presented to said B port into fundamental-mode waves at wavelength $\lambda_n$ which are disposed to said A port and passing second-mode waves of all other wavelengths to said two-mode grating A port as second-mode waves;

wherein said broadband input is coupled to said first two-mode coupler port A, said auxiliary input is coupled to said first two-mode coupler port B, said first two-mode coupler port C is coupled to said first two-mode long-period grating port A, said first two-mode long-period grating port B is coupled to said second two-mode coupler port A, said first two-mode coupler port D is coupled to said second two-mode long-period grating port A, said second two-mode long-period grating port B is coupled to said second two-mode coupler port B, said wavelength-suppressed output is coupled to said second two-mode coupler port C, and said wavelength-selective output is coupled to said second two-mode coupler port D.

2. The filter of claim 1 wherein said two-mode couplers are made from two-mode fiber.

3. The filter of claim 1 wherein said two-mode gratings are made from two-mode fiber.

4. The filter of claim 1 wherein said filter is made from a pair of two-mode fibers, the first fiber fabricated to comprise sequentially said broadband input, said first two-mode coupler ports A and C, said first two-mode grating, said second two-mode coupler ports A and C, and said wavelength-supressive output, the second fiber fabricated to comprise sequentially said wavelength-selective output, said first two-mode coupler ports B and D, second two-mode grating, said second two-mode coupler ports B and D, and said auxiliary input.

5. The de-multiplexing mode-insensitive filter of claims 1, 2, 3, or 4, wherein said broadband input contains said plurality n of said unique wavelengths $\lambda_n$ comprising a mixture of fundamental-mode and second-mode waves corresponding to said $\lambda_n$ of said long-period two-mode gratings, said fundamental-mode waves applied to said broadband input coupling to said first long-period two-mode grating and being converted to co-propagating second-mode waves thereafter disposed to said auxiliary port, and said second mode waves applied to said broadband input coupling to said second two-mode grating and being converted to co-propagating fundamental-mode waves thereafter disposed to said auxiliary port.

6. The multiplexing mode-insensitive filter of claims 1, 2, 3, or 4, wherein said unique wavelength $\lambda_n$ comprising a mixture of fundamental-mode and second-mode waves corresponding to said long-period two-mode grating $\lambda_n$ is applied to said wavelength-selective port, said fundamental-mode waves applied to said wavelength-selective port being converted by said second long-period two-mode grating into co-propagating second-mode waves disposed to said wavelength-suppressed port, said second-mode waves applied to said wavelength-selective port coupling to said first long-period two-mode grating and being converted to co-propagating fundamental-mode waves disposed to said wavelength-suppressed port.

7. A mode-converting filter having a broadband input, a wavelength-suppressed output, a wavelength-selective output, and an auxiliary input comprising:

a first and second-mode-converting coupler wherein each of said mode-converting couplers has first and second single-mode ports and first and second two-mode ports, said mode-converting coupler converting substantially all fundamental-mode wave power presented to said first single-mode port into second-mode wave power coupled to said second two-mode port, and converting substantially all fundamental-mode wave power presented to said second single-mode port into second-mode wave power coupled to said first two-mode port, and further coupling fundamental-mode waves from said second two-mode port to said first two-mode port with substantially no coupling to either of said single-mode ports;

a long-period two-mode grating having first and second ports, said grating accepting second-mode waves presented to said first port and directing said second-mode waves to said second port, further converting said second-mode waves at wavelength $\lambda_n$ into fundamental-mode waves which are disposed to said second port, said grating also accepting fundamental-mode waves presented to said first port and directing said fundamental-mode waves to said second port, further converting said fundamental-mode waves at wavelength $\lambda_n$ into second-mode waves which are disposed to said second port;

wherein said broadband input is coupled to said first mode-converting coupler first single-mode port, said auxiliary input is coupled to said first mode-converting coupler first two-mode port, said first mode-converting coupler second single-mode port is optionally coupled to said second-mode-converting coupler first single-mode port, said first mode-converting coupler second two-mode port is coupled to said first two-mode grating port, said second two-mode grating port is coupled to said second mode-converting coupler first two-mode port, said wavelength-suppressed output is coupled to said second two-mode coupler second single-mode port, and said wavelength-selective output is coupled to said second two-mode coupler second two-mode port.

8. The mode-converting filter of claim 7 wherein said first and second mode-converting couplers and said long-period two-mode grating are made using optical fiber.

9. The mode-converting filter of claim 8 wherein said optical fiber is two-mode fiber for said two-mode ports of said first and second mode-converting couplers, said optical fiber is single-mode fiber for said single-mode ports of said first and second mode-converting couplers, and said optical fiber is two-mode fiber for said long-period mode-converting grating.

10. The de-multiplexing mode-converting filter of claims 7, 8, or 9, wherein said broadband input contains said plurality n of said unique second-mode waves at wavelength $\lambda_n$ corresponding to said $\lambda_n$ of said long-period two-mode grating, said unique second-mode wavelength $\lambda_n$ coupling to said two-mode long-period grating, said long-period two-mode grating converting said second-mode wave to a co-propagating fundamental-mode wave which is disposed to said auxiliary port.

11. The multiplexing mode-converting filter of claims 7, 8, or 9, wherein said unique fundamental-mode wavelength $\lambda_n$ corresponding to said long-period two-mode grating $\lambda_n$ is applied to said wavelength-selective port, said second-mode wave passing through said first two-mode coupler to said long-period two-mode grating, said two-mode grating converting said fundamental-mode wave to a co-propagating second-mode wave, said second mode wave thereafter coupling through said second two-mode coupler to said wavelength-suppressed port.

12. A wavelength multiplexing and demultiplexing system comprising:

a wave reflector having a first port and a second port, said wave reflector comprising a two-mode coupler having a coupler first port coupled to said wave reflector first port, a coupler second sort coupled to said wave reflector second port, and a coupler mixed-mode port selectively coupling second-mode waves presented to said coupler mixed-mode port and directing them to said coupler second port, and said coupler mixed-mode port coupled to a plurality n of two-mode gratings, each said two-mode grating reflecting and converting fundamental-mode waves at a unique wavelength $\lambda_n$ into counter-propagating second-mode waves at wavelength $\lambda_n$;

a plurality n of wave filters in equal number to said plurality n of said two-mode gratings, each wave filter having a first port, a drop port, and an extension port, wherein the first said wave filter first port is coupled to said wave reflector second port, and each subsequent said wave filter first port is coupled to the previous said wave filter extension port, each of said wave filters further comprising a two-mode coupler having a first port coupled to said wave filter first port, a second port responsive to second-mode waves presented to said coupler first port, and a drop port responsive to fundamental-mode waves presented to said coupler second port, said coupler second port further coupled to a two-mode grating converting and reflecting fundamental-mode waves at wavelength $\lambda_n$ into counter-propagating second-mode waves back to said coupler second port, and passing waves not at wavelength $\lambda_n$ to said wave filter extension port.

13. The system of claim 12 performing as a strain sensor wherein each sensor is formed by applying a unique and unknown strain to each of said n two-mode gratings of said wave reflector and a known strain to each of said two-mode gratings in said wave filters while applying a spectrally broadband source to said wave reflector first port, further modifying each of said known strains until a maximum power level is obtained at each of said wave filter drop ports, whereby said unknown strain for each of said wave reflector $\lambda_n$ gratings is thereafter equal to said known strain in each of said n wave filter gratings.

14. The system of claim 12 operating as a frequency multiplexer wherein a plurality n of unigue wavelength fundamental-mode waves is coupled to each of n said wave filter drop ports, each said wavelength corresponding to one of said wave reflector grating wavelengths, and one of said wave filter grating wavelengths, wherein said wave reflector first port contains the aggregate of said n fundamental-mode waves.

15. The system of claim 12 operating as a frequency demultiplexer wherein a plurality n of unique $\lambda_n$ fundamental-mode wave energy wavelengths is presented into said wave reflector first port, each said wavelength corresponding to one of said wave reflector grating wavelengths, and one of said wave filter grating wavelengths, wherein each wavelength $\lambda_n$ is selectively present at each of said wave wave filter drop ports n.

16. A mode-converting filter having a broadband input, a wavelength-suppressed output, a wavelength-selective output, and an auxiliary port, comprising:

a first and second mode-converting coupler wherein each of said mode-converting couplers has first and second single-mode ports and first and second two-mode ports, said mode-converting coupler converting substantially all fundamental-mode wave power presented to said first single-mode port into second-mode wave power coupled to said second two-mode port, and converting substantially all fundamental-mode wave power presented to said second single-mode port into second-mode wave power coupled to said first two-mode port, and coupling fundamental-mode waves from said first two-mode port to said second two-mode port and further coupling fundamental-mode waves from said second two-mode port to said first two-mode port with substantially no coupling to either of said single-mode ports;

a two-mode short-period grating having first and second ports, said two-mode short-period grating converting and reflecting second-mode wave energy presented to said first port back to said first port as fundamental-mode waves at wavelength $\lambda_n$, and passing second-mode waves of all other wavelengths to said two-mode grating second port;

wherein said broadband input is coupled to said first mode-converting coupler first single-mode port, said wavelength-selective output is coupled to said first mode-converting coupler first two-mode port, said first mode-converting coupler second single-mode port is optionally coupled to said second mode-converting coupler first single-mode port, said first mode-converting coupler second two-mode port is coupled to said first two-mode grating port, said second two-mode grating port is coupled to said second mode-converting coupler first two-mode port, said auxiliary port is coupled to said second two-mode coupler second two-mode port, and said wavelength-suppressed output is coupled to said second two-mode coupler second single-mode port.

17. The mode-converting filter of claim 16 wherein said first and second mode-converting couplers and said two-mode grating comprise optical fiber.

18. The mode-converting filter of claim 17 wherein said optical fiber is two-mode fiber for said two-mode ports of said first and second mode-converting couplers, said optical fiber is single-mode fiber for said single-mode ports of said first and second mode-converting couplers, and said optical fiber is two-mode fiber for said mode-converting grating.

19. The de-multiplexing mode-converting filter of claims 16, 17, or 18, wherein said broadband input contains said plurality n of said unique second-mode waves at wavelength $\lambda_n$ corresponding to said $\lambda_n$ of said short-period two-mode grating, said unique second-mode wavelength $\lambda_n$ coupling to said two-mode short-period grating, said short-period two-mode grating converting said second-mode wave to a counter-propagating fundamental-mode wave which is disposed to said wavelength-selective port.

20. The multiplexing mode-converting filter of claims 16, 17, or 18, wherein said unique fundamental-mode wavelength $\lambda_n$ corresponding to said short-period two-mode grating $\lambda_n$ is applied to said auxiliary port, said fundamental-mode wave passing through said second two-mode coupler to said short-period two-mode grating, said two-mode grating converting said fundamental-mode wave to a counter-propagating second-mode wave, said second mode wave thereafter coupling through said second two-mode coupler to said wavelength-suppressed port.

21. A mode insensitive filter having a broadband input, a wavelength-suppressed output, a wavelength-selective output, and an auxiliary input, comprising a first and second two-mode coupler wherein each of said two-mode couplers has an A, B, C, and D port; said A and said C ports bidirectionally passing fundamental-mode waves to each other without substantial coupling said fundamental-mode waves to any other port, said B and said D ports bidirectionally passing fundamental-mode waves to each other without substantially coupling to any other port, said A port and said D port bidirectionally coupling substantially all second-mode waves to each other without substantially coupling any said second-mode waves to any other port, and said B port and said C port bidirectionally coupling substantially all second-mode waves to each other without substantially coupling any said second-mode waves to any other port;

a first and second two-mode grating each having A and B ports, said two-mode grating converting and reflecting second-mode wave energy presented to said A port back to said A port as fundamental-mode waves at wavelength $\lambda_n$, and passing second-mode waves of all other wavelengths to said two-mode grating B port, said two-mode grating also converting and reflecting second-mode wave energy presented to said B port back to said B port as fundamental-mode waves at wavelength $\lambda_n$, and passing second-mode waves of all other wavelengths to said two-mode grating A port;

wherein said broadband input is coupled to said first two-mode coupler port A, said wavelength-selective output is coupled to said first two-mode coupler port B, said first two-mode coupler port C is coupled to said first two-mode grating port A, said first two-mode grating port B is coupled to said second two-mode coupler port A, said first two-mode coupler port D is coupled to said second two-mode grating port A, said second two-mode grating port B is coupled to said second two-mode coupler port B, said wavelength-suppressed output is coupled to said second two-mode coupler port C, and said auxiliary input is coupled to said second two-mode coupler port D.

22. The filter of claim 21 wherein said two-mode couplers are made from two-mode fiber.

23. The filter of claim 21 wherein said two-mode gratings are made from two-mode fiber.

24. The filter of claim 21 wherein said filter is made from a pair of two-mode fibers, the first fiber fabricated to comprise sequentially said broadband input, said first two-mode coupler ports A and C, said first two-mode grating, said second two-mode coupler ports A and C, and said wavelength-supressive output, the second fiber fabricated to comprise sequentially said wavelength-selective output, said first two-mode coupler ports B and D, second two-mode grating, said second two-mode coupler ports B and D, and said auxiliary input.

25. The de-multiplexing mode-insensitive filter of claims 21, 22, 23, or 24, wherein said broadband input contains said plurality n of said unique wavelengths $\lambda_n$ comprising a mixture of fundamental-mode and second-mode waves corresponding to said $\lambda_n$ of said short-period two-mode gratings, said fundamental-mode waves applied to said broadband input coupling to said first short-period two-mode grating and being converted to counter-propagating second-mode waves thereafter disposed to said wavelength-selective port, and said second mode waves applied to said broadband input coupling to said second two-mode grating and being converted to counter-propagating fundamental-mode waves thereafter disposed to said wavelength-selective port.

26. The multiplexing mode-insensitive filter of claims 21, 22, 23, or 24, wherein said unique wavelength $\lambda_n$ comprising a mixture of fundamental-mode and second-mode waves corresponding to said short-period two-mode gratings $\lambda_n$ is applied to said auxiliary port, said fundamental-mode waves applied to said auxiliary port being converted by said second short-period two-mode grating into counter-propagating second-mode waves disposed to said wavelength-suppressed port, said second-mode waves applied to said auxiliary port coupling to said first short-period two-mode grating and being converted to counter-propagating fundamental-mode waves disposed to said wavelength-suppressed port.

* * * * *

UNITED STATES PATENT AND TRADEMARK OFFICE
CERTIFICATE OF CORRECTION

PATENT NO. : 5,940,556
DATED : August 17, 1999
INVENTOR(S) : Moslehi et al.

It is certified that error appears in the above-identified patent and that said Letters Patent is hereby corrected as shown below:

<u>Column 1,</u>
Line 4, add the following sentence:

"This invention was made with government support under NASA contract NAS1-20579 awarded by NASA. The government has certain rights in this invention"

Signed and Sealed this

Twenty-seventh Day of November, 2001

Attest:

NICHOLAS P. GODICI
*Attesting Officer*    *Acting Director of the United States Patent and Trademark Office*